Sept. 7, 1943.  F. D. KNOBLOCK  2,329,060
DIFFERENTIAL MECHANISM
Filed June 8, 1942    2 Sheets-Sheet 1
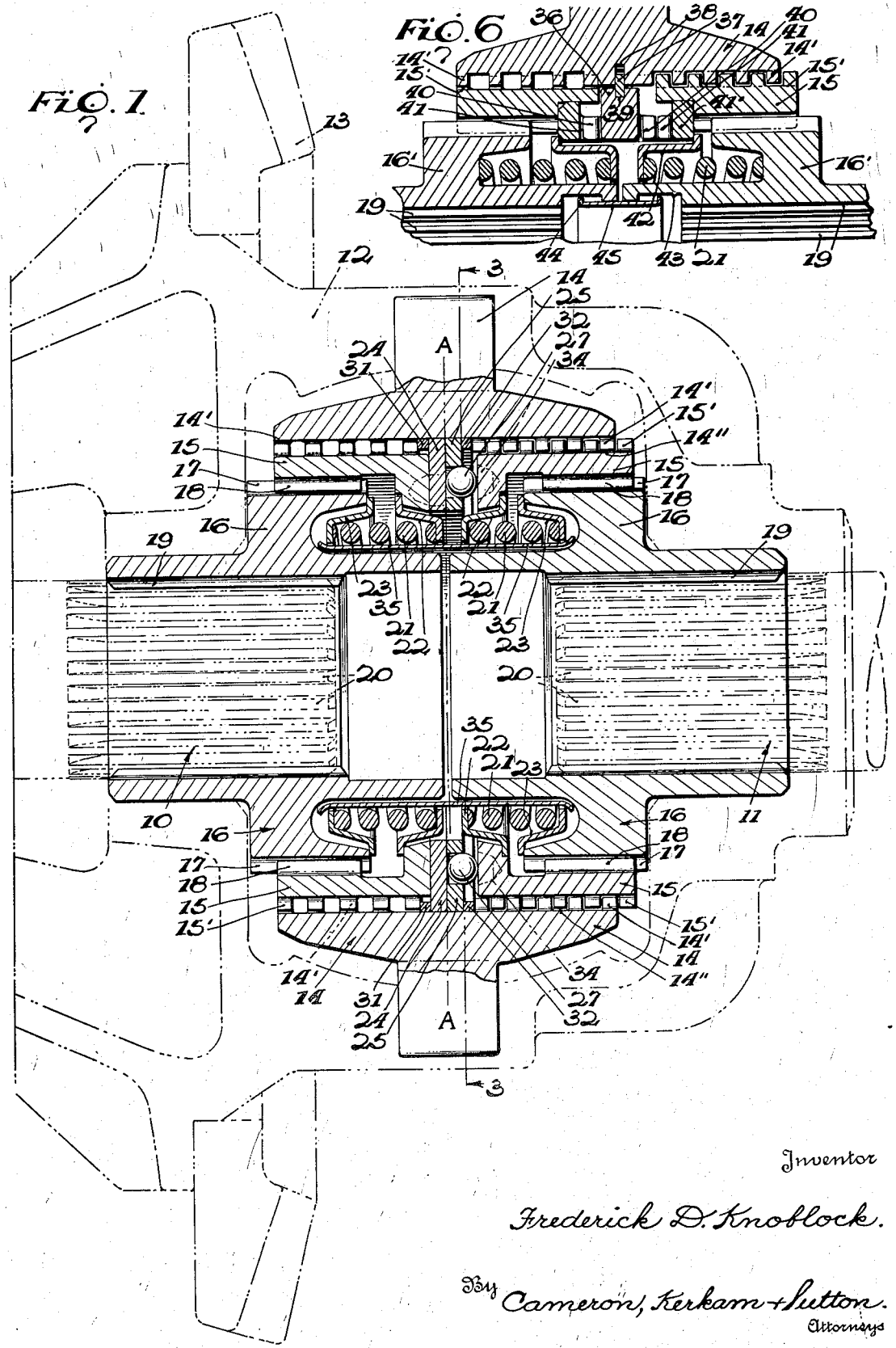
Inventor
Frederick D. Knoblock.
By Cameron, Kerkam + Sutton.
Attorneys

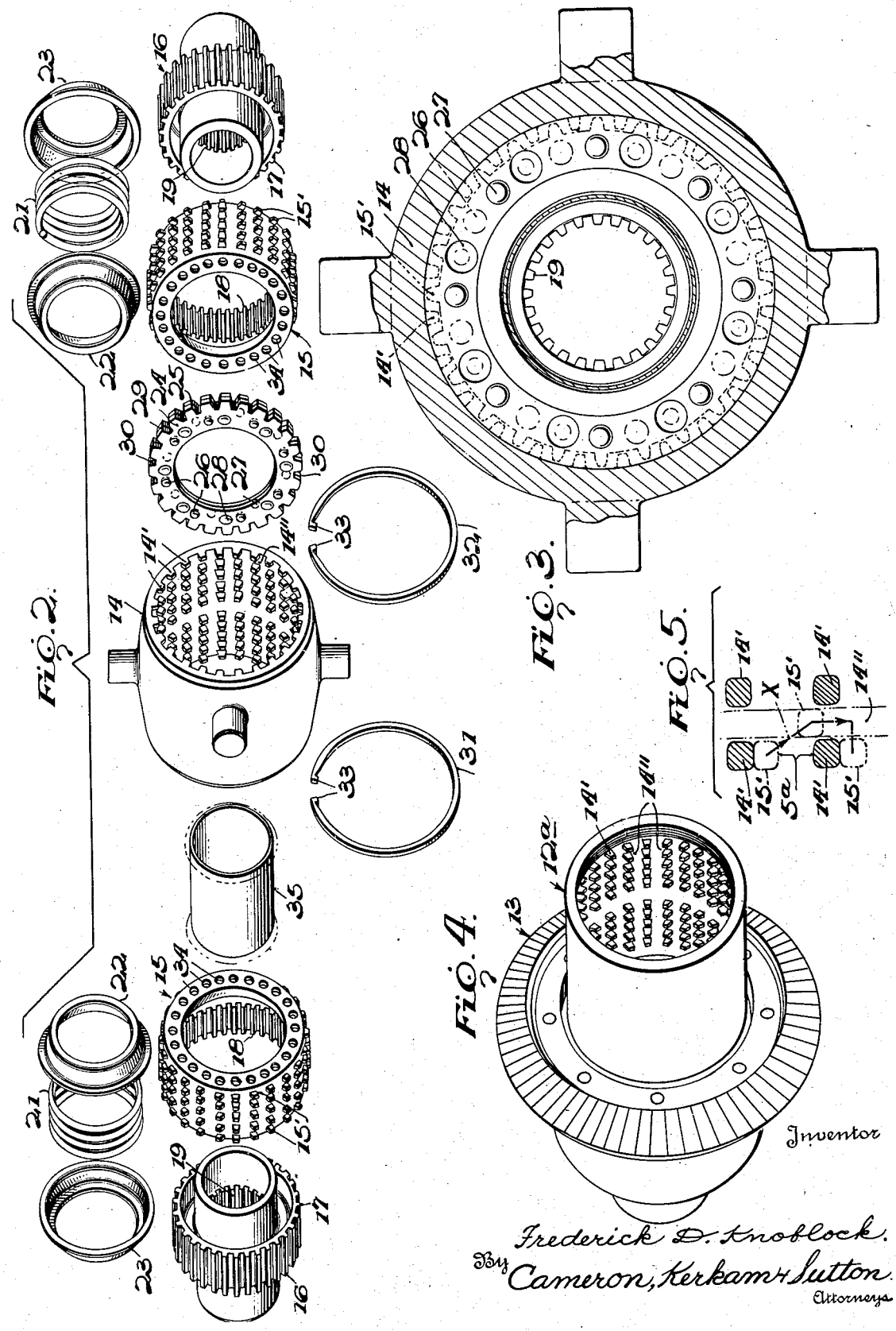

Patented Sept. 7, 1943

2,329,060

UNITED STATES PATENT OFFICE 2,329,060

DIFFERENTIAL MECHANISM

Frederick D. Knoblock, Birmingham, Mich., assignor, by mesne assignments, to Patent Developers, Inc., Detroit, Mich., a corporation of Michigan Application June 8, 1942, Serial No. 446,223

18 Claims. (Cl. 74—389.5)

The present invention is an improvement in axle differentials or compensators for two opposed shafts, which becomes operative for differentiation when there is relative speed between the two shafts.

An object of the invention is to simplify and cheapen the construction and the labor of manufacture, assembly and disassembly without impairment of efficiency or durability.

A second object is to provide a construction of driving member and driven members having a maximum of clutch teeth which is of particular importance when the differential is in a steering axle.

A third object is to minimize the movement necessary to effectively declutch the driving member and driven members when differentiation takes place and after said declutching to clutch the driving member and driven member by a spring action.

A fourth object is to simplify and cheapen the declutching mechanism, to readily and effectively position the same between the driven clutch members, and to prevent transference of thrust from one driven member to the other through said declutching mechanism.

A fifth object is to improve the spring system associated with each driven member and sleeve.

Another object is to provide a differential which is particularly quiet in operation.

The invention will be better understood by reference to the accompanying drawings illustrating one expression of the inventive idea and wherein Fig. 1 is a section through the differential, the housing and ring gear being shown in dotted lines;

Fig. 2 is an exploded view of the several parts;

Fig. 3 is a view, partly in section and partly in elevation, along the line 3—3, Fig. 1;

Fig. 4 is a view showing the interrupted splines or teeth formed on the interior of the housing in order to eliminate the spider;

Fig. 5 is a diagrammatic detail showing the axial and circumferential relation between the spline teeth on the interior of the housing or spider and the spline teeth on the driven members; and Fig. 6 is a detail of a modified form of camming device.

Referring to the drawings, wherein like reference numerals indicate like parts, 10 and 11 indicate the adjacent ends of two opposed shafts on which the differential is mounted; 12 is the differential housing, and 13 is a ring gear fixed to the housing by any suitable means.

Mounted within the housing 12 and rotatable therewith is a spider 14. The interior of this spider is provided with a plurality of rows of interrupted splines or spline teeth 14', the splines being preferably first formed axially by a broaching operation after which slots are milled circumferentially across the splines thus forming rows of the splined teeth 14' grouped in vertical banks along the spider axis. As shown in Fig. 4 the teeth 14' may be formed on the interior of the housing 12a thus dispensing with the spider 14 in which event the housing 12a and not the spider 14 becomes the driving member.

On each side of a medial line A—A there is a driven member 15, a sleeve member 16 having splines 17 engaging splines 18 on said driven members, and splines 19 engaging splines 20 on said shafts 10 and 11. Between each driven member 15 and sleeve member 16 is a coil spring 21 that is held between a pressure ring 22 bearing upon the driven member 15 and a pressure ring 23 bearing upon the sleeve member 16. The driven member 15 is moved axially outward against the compression of spring 21 in the declutching operation and is moved inwardly by said spring in the clutching operation.

The driven clutch members 15 are provided on their peripheries with a plurality of rows of interrupted splines 15' that engage the interrupted splines 14' on the interior of the spider 14 or on the interior of the housing 12a (Fig. 4) when the clutch is closed. These interrupted splines or spline teeth 15' are preferably formed by a hobbing operation after which slots are milled across the splines.

The declutching operation is effected when the shafts 10 and 11 rotate at different speeds which causes the operation of a camming device resulting in the outward axial movement of one of the driven members 15 a short distance sufficient to cause the spline teeth 15' thereon to clear the interrupted spline teeth 14' and to pass through the spaces or slots 14" therebetween (Fig. 5). The multiplicity of engaging interrupted spline teeth 15' on the driven member 15 and the teeth 14' on the housing 12 or the spider 14, and the multiplicity of spaces or slots 14" between the spline teeth largely decreases the necessary axial movement of the driven member 15, decreases backlash and also resulting shock loads and secures smoother operation for either a complete clutching or declutching action. In view of the fact that in the declutching operation the teeth 15' move axially with respect to teeth 14' and also circumferentially through spaces 14" sufficient space (see Fig. 5) must be provided between the teeth in the axial rows as well as the teeth in the circumferential rows or banks for effective clearance in operation. The space between any two teeth in an axial row must be greater than the axial dimension of a tooth. The space between the teeth in any circumferential row or bank will be controlled by the design of the cam used in the declutching operation. Further the ends of the teeth in an axial direction should be sufficiently curved (Fig. 5) to facilitate engagement and disengagement of the teeth. In Fig. 5 teeth 15' are shown abutting teeth 14' with the backlash or lost motion indicated at 5a. The amount of backlash is just sufficient to permit any driven tooth 15' (Fig. 5) to move through the path indicated by the dotted line X into abutting relation with the next circumferential tooth in the next axial row.

The camming device for effecting the declutching operation is positioned on the medial line A—A and in one of the preferred embodiments of the inventive idea comprises two rings 24 and 25 that constitute the retainer for balls 26 and 27. Balls 26 are carried by ring 24 and balls 27 by ring 25, the center of the balls 26 and 27 lying inboard of the faces of the rings 24 and 25. The balls are arranged in staggered relation (Fig. 3) on the two rings 24 and 25 so that the cam reaction of the balls carried by one ring is transmitted to the housing 12a or spider 14 through the other ring in the declutching operation. The two rings are secured together as by rivets 28. The rings 24 and 25 are provided on their periphery with splines 29, the spaces 30 between which splines are large enough to clear the rows of spline teeth 14' so that the ball retainer can be readily positioned on the medial line A—A where it is locked by snap rings 31 and 32, one on each side thereof. These rings have enlargements 33 at their free ends for engagement by the tool that is used in installing the same.

The balls 26 and 27 during the clutching condition seat in cam depressions 34 which are arranged on the inner adjacent faces of the driven members 15. When one of the shafts 10 or 11 differentiates the balls are cammed out of said depressions 34 as the result of which the driven member 15 is moved axially so that the teeth 15' thereon clear the teeth 14' and register with the spaces 14" between the teeth 14' whereby relative rotation occurs and declutching is effected. As heretofore noted the space between any two teeth in a circumferential row or bank depends on the same design and in this embodiment would be controlled by the depth and slope of the depressions 34. As will be observed there are as many cam depressions 34 on each driven member 15 as there are rows of teeth 15', the number of balls 26 or 27 being less than the number of cam depressions so that the re-engagement of balls 26 or 27 with cam depressions 34 is expedited.

The interrupted spline teeth 14' on the interior of the housing 12a or spider 14 and the exterior spline teeth 15' on the driven members 15 and on the ball retainer rings 24 and 25, the splined connection between the driven members 15 and the sleeve members 16, and the splined connections between the sleeve members 16 and the shafts 10 and 11 facilitate and cheapen the production, assembly and disassembly of the differential, while at the same time producing a structure of great simplicity, certainty and ease of operation, efficiency and durability.

In the assembly of the parts as shown in Fig. 1, the left-hand sleeve member 16 is first placed in the ring gear half of the housing 12. Then there is inserted a subassembly comprising the spider 14, the ball retainer rings 24 and 25 carrying the balls 26 and 27 and held in place in the spider 14 by the snap rings 31 and 32, the two driven members 15 held against the balls 26 and 27 by the pressure rings 22, springs 21 and pressure rings 23, and spring retainer 35 with its marginal edges flared outward. Then the right-hand sleeve member 16 is splined into its driven clutch member 15. Then the right-hand half of the differential housing 12 is applied. Lastly the axle shafts are inserted.

The spring retainer 35 supports the balance of the assembly when the sleeve members 16 are removed. It is pointed out that the relation of the two sleeve members 16 on the shafts 10 and 11 is such that any undersired axial thrust imparted to one sleeve members during assembly of the parts is at once transmitted to the other sleeve member 16 and thence to the differential housing 12, thus preventing any thrust from being transmitted under these circumstances from one driven member 15 to the other driven member 15 through the balls 26 or 27.

In the modification shown in Fig. 6 the camming device comprises a clutch disengaging ring 36 which can rotate relative to the housing 12a or spider 14 but cannot move axially relative thereto. The connection between the ring 36 and the part in which it is mounted is a snap ring 37 which engages in a groove 38 in the spider or housing and a registering groove 39 in the ring 36. The clutch disengaging ring is provided on each face with a series of cam teeth 40 that engage corresponding cam teeth 41 on a part 41' of the driven clutch member 15 which part 41' is welded or otherwise suitably secured to the driven clutch member 15. When the shafts 10 and 11 differentiate the driven clutch members 15 are movable axially as heretofore described. As shown in Fig. 6 the right-hand member 15 has been moved to declutching position. Further as shown in this view each spring engages a sleeve 16' and a pressure ring 42. To facilitate assembly the two sleeves 16' are provided at their juxtaposed inner ends with grooves or recesses 43 into which project the flared edges 44 of a split ring 45.

While several embodiments of the inventive idea have been illustrated and described in detail it is apparent that the inventive idea may have other mechanical expressions within the limits of the appended claims.

What is claimed is:

1. In an axle differential or compensator for two opposed shafts, a rotatable driving member provided on its interior with a plurality of interrupted splines, a pair of driven clutch members provided with corresponding interrupted splines, means for moving one of said driven clutch members axially to disengage the splines thereon from those on the driving member when the shafts rotate at different speeds, and spring means for moving said driven member axially in the opposite direction to engage the splines thereon with the splines on the driving member.

2. In an axle differential or compensator for two opposed shafts, a housing, a spider mounted therein and rotatable therewith the interior of said spider being provided with a plurality of interrupted splines, a pair of driven clutch members provided with corresponding interrupted splines, means for moving one of said driven clutch members axially to disengage the splines thereon from those on the spider when the shafts rotate at different speeds, and spring means for moving said driven member axially in the opposite direction to engage the splines thereon with the splines on the spider.

3. In an axle differential or compensator for two opposed shafts, a rotatable driving member provided on its interior with a plurality of interrupted splines, a pair of driven clutch members provided with corresponding interrupted splines, a cam device positioned between said driven clutch members and operating to move one of the same axially to disengage the interrupted splines thereon from the splines on the driving member when the shafts rotate at different speeds, and a sleeve member associated with each driven member and a shaft, and having a splined connection with said driven member.

4. In an axle differential or compensator for two opposed shafts, a housing, a spider mounted therein and rotatable therewith the interior of said spider being provided with a plurality of interrupted splines, a pair of driven clutch members provided with corresponding interrupted splines, a cam device positioned between said driven clutch members and operating to move one of the same axially to disengage the interrupted splines thereon from the splines on the spider when the shafts rotate at different speeds, and a sleeve member associated with each driven member and a shaft and having a splined connection with said driven member.

5. In an axle differential or compensator for two opposed shafts, a housing, a spider mounted therein and rotatable therewith the interior of said spider being provided with a plurality of interrupted splines, a pair of driven clutch members provided with corresponding interrupted splines, a cam device positioned between said driven clutch members and operating to move one of the same axially to disengage the interrupted splines thereon from the splines on the spider when the shafts rotate at different speeds, a locking means for said camming device, and a sleeve member associated with each driven member and a shaft and having a splined connection with said driven member.

6. In an axle differential or compensator for two opposed shafts, a housing, a spider mounted therein and rotatable therewith the interior of said spider being provided with a plurality of interrupted splines, a pair of driven clutch members provided with corresponding interrupted splines, a cam device positioned between said driving clutch members and operating to move one of the same axially to disengage the interrupted splines thereon from the splines on the spider when the shafts rotate at different speeds, said cam device being splined on its outer edge for movement into said spider between said driven clutch members, a locking ring for said camming device to prevent axial movement thereof relative to the spider, and a sleeve member associated with each driven member and a shaft and having a splined connection with said driven member.

7. In an axle differential or compensator for two opposed shafts, a rotatable driving member provided on its interior with a plurality of interrupted splines, a pair of driven clutch members provided with corresponding interrupted splines, a ball retainer positioned between said driven clutch members, means for locking said retainer axially, two series of staggered camming balls carried by said retainer and each series normally seating in cam depressions in its associated driven member, said balls of one series leaving said depressions in the operation of differentiation and moving its associated driven member axially outward to disengage the interrupted splines thereon from the splines on the driving member whereby the reaction of the balls carried by one ring is transmitted to the other ring during the declutching operation, and a sleeve member associated with each driven member and a shaft and having a splined connection with said driven member.

8. In an axle differential or compensator for two opposed shafts, a housing, a spider mounted therein and rotatable therewith the interior of said spider being provided with a plurality of interrupted splines, a pair of driven clutch members provided with corresponding interrupted splines, a ball retainer splined on its outer edge for movement into said spider between said driven clutch members, a pair of snap rings for locking said retainer in position, two series of staggered camming balls carried by said retainer and each series normally seating in cam depressions in its associated driven member, said balls of one series leaving said depressions in the operation of differentiation and moving its associated driven member axially outward to disengage the interrupted splines thereon from the splines on the spider whereby the reaction of the balls carried by one ring is transmitted to the spider through the other ring during the declutching operation, and a sleeve member associated with each driven member and a shaft and having a splined connection with said driven member.

9. In an axle differential or compensator for two opposed shafts, a rotatable driving membern provided on its interior with a plurality of interrupted splines, a driven clutch member for each shaft provided with corresponding interrupted splines and also provided with depressions on its inner end face, a ball retainer positioned between said driven clutch members, a plurality of balls carried by said retainer and normally seating in said depressions and operating to move a driven clutch member axially to disengage the interrupted splines thereon from the splines on the driving member in the operation of differentiation, a sleeve member interposed and drivingly connected between each shaft and driven member, and spring means positioned between each driven member and its associated sleeve member.

10. In an axle differential or compensator for two opposed shafts, a housing, a spider mounted therein and rotatable therewith the interior of said spider being provided with a plurality of interrupted splines, a driven clutch member for each shaft provided with corresponding interrupted splines and also provided with depressions on its inner end face, a ball retainer positioned between said driven clutch members, a plurality of balls carried by said retainer and normally seating in said depressions and operating to move a driven clutch member axially to disengage the interrupted splines thereon from the splines on the spider in the operation of differentiation, a sleeve member interposed and drivingly connected between each shaft and driven member, and spring means positioned between each driven member and its associated sleeve member.

11. In an axle differential or compensator for two opposed shafts, a housing, a spider mounted therein and rotatable therewith the interior of said spider being provided with a plurality of interrupted splines, a driven clutch member for each shaft provided with corresponding interrupted splines and also provided with depressions on its inner end face, a ball retainer positioned between said driven clutch members, a plurality of balls carried by said retainer and normally seating in said depressions and operating to move a driven clutch member axially to disengage the interrupted splines thereon from the splines on the spider, a sleeve member interposed and drivingly connected between each shaft and driven member, a spring positioned between each driven member and its associated sleeve member, and a pair of pressure rings for each spring one bearing against a driven member and the other against a sleeve member.

12. In an axle differential or compensator for two opposed shafts, a rotatable driving member provided on its interior with a plurality of interrupted splines, a driven clutch member for each shaft provided with corresponding interrupted splines and also provided with depressions on its inner end face, a ball retainer positioned between said driven clutch members, a plurality of balls carried by said retainer and normally seating in said depressions and operating to move a driven clutch member axially to disengage the interrupted splines thereon from the splines on the driving member, a sleeve member interposed and drivingly connected between each shaft and driving member, a spring positioned between each driven member and its associated sleeve member, and a cylindrical retainer holding the balance of the assembly in place when said sleeve members are removed.

13. In an axle differential or compensator for two opposed shafts, a housing, a spider mounted therein and rotatable therewith the interior of said spider being provided with a plurality of interrupted splines, a driven clutch member for each shaft provided with corresponding interrupted splines and also provided with depressions on its inner end face, a ball retainer positioned between said driven clutch members, a plurality of balls carried by said retainer and normally seating in said depressions and operating to move a driven clutch member axially to disengage the interrupted splines thereon from the splines on the spider, a sleeve member interposed and drivingly connected between each shaft and driving member, a spring positioned between each driven member and its associated sleeve member, a pair of pressure rings for each spring one bearing against a driven member and the other against a sleeve member, and a cylindrical retainer holding the balance of the assembly in place when said sleeve members are removed.

14. In an axle differential or compensator for two opposed shafts, a rotatable driving member provided on its interior with rows of teeth arranged axially thereof and in vertical banks along the axis of said driving member, a driven member for each shaft provided on its periphery with corresponding teeth, a cam device positioned between said driven members operating to move a driven member axially to disengage the teeth thereon from the teeth on the driving member, a sleeve member interposed and drivingly connecting each shaft with a driven member, and a spring positioned between each driven member and its associated sleeve member.

15. In an axle differential or compensator for two opposed shafts, a housing, a spider mounted therein and rotatable therewith, the interior of said spider being provided with rows of teeth arranged axially thereof and in vertical banks along the axis of said spider, a driven member for each shaft provided on its periphery with corresponding teeth, a cam device positioned between said driven members operating to move a driven member axially to disengage the teeth thereon from the teeth on the spider, a sleeve member interposed and drivingly connecting each shaft with a driven member, and a spring positioned between each driven member and its associated sleeve member.

16. In an axle differential or compensator for two opposed shafts, a housing, a spider mounted therein and rotatable therewith, the interior of said spider being provided with rows of teeth arranged axially thereof and in vertical banks along the axis of said spider, a driven member for each shaft provided on its periphery with corresponding teeth and also provided with depressions on its inner end face, a ball retainer positioned between said driven members, two series of balls carried by said retainer one series for each driven member and normally seating in said depressions and operating to move its driven member axially to disengage the teeth thereon from the teeth on the spider, a sleeve member interposed and drivingly connecting each shaft with a driven member, and spring means for re-engaging the teeth on said driven members with the teeth on said spider.

17. In an axle differential or compensator for two opposed shafts, a rotatable driving member provided on its interior with rows of teeth arranged axially thereof and in vertical banks along the axis of said driving member, a driven member for each shaft provided on its periphery with corresponding teeth and also provided with depressions on its inner end face, a ball retainer positioned between said driven members, two series of balls carried by said retainer one series for each driven member and normally seating in said depressions and operating to move its driven member axially to disengage the teeth thereon from the teeth on the driving member, the number of balls in each series being less than the number of depressions in the associated driven member, a sleeve member interposed and drivingly connecting each shaft and driven member, and spring means for re-engaging the teeth on said driven members with the teeth on said spider.

18. In an axle differential or compensator for two opposed shafts, a housing, a spider mounted therein and rotatable therewith, the interior of said spider being provided with rows of teeth arranged axially thereof and in vertical banks along the axis of said spider, a driven member for each shaft provided on its periphery with corresponding teeth and also provided with depressions on its inner end face, a ball retainer positioned between said driven members, two series of balls carried by said retainer one series for each driven member and normally seating in said depressions and operating to move its driven member axially to disengage the teeth thereon from the teeth on the spider, the number of balls in each series being less than the number of depressions in the associated driven member, a sleeve member interposed and drivingly connecting each shaft and driven member, and spring means for re-engaging the teeth on said driven members with the teeth on said spider.

FREDERICK D. KNOBLOCK.